No. 724,946. PATENTED APR. 7, 1903.
E. K. ROTHE.
BEARING FOR THE ELEVATING SCREW APPARATUS OF
FIELD OR OTHER GUNS.
APPLICATION FILED OCT. 1, 1902.
NO MODEL.
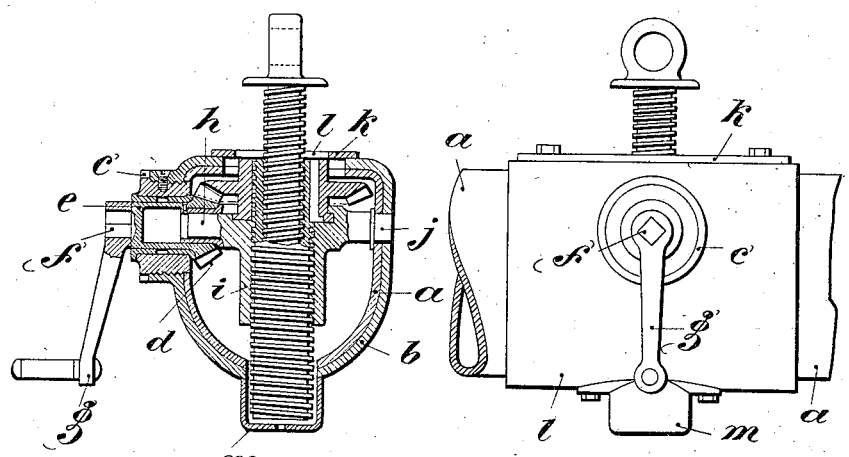
Witnesses:
Inventor
Ernst K. Rothe
By James L. Norris
Atty.

UNITED STATES PATENT OFFICE.

ERNST KARL ROTHE, OF EISENACH, GERMANY

BEARING FOR THE ELEVATING-SCREW APPARATUS OF FIELD OR OTHER GUNS.

SPECIFICATION forming part of Letters Patent No. 724,946, dated April 7, 1903.

Application filed October 1, 1902. Serial No. 125,554. (No model.)

*To all whom it may concern:*

Be it known that I, ERNST KARL ROTHE, engineer, a subject of the Grand Duke of Saxe-Weimar, residing at Eisenach, in the Grand Duchy of Saxe-Weimar and German Empire, have invented certain new and useful Improvements in or Relating to Bearings for the Elevating-Screw Apparatus of Field or other Guns, of which the following is a specification.

My present invention relates to an improved construction of bearing for the elevating-screw apparatus of field and other guns, according to which the elevating apparatus is so mounted in the interior of the closed carriage-trail that the axis of the crank actuating the screw-spindle constitutes at the same time the axis of rotation of the spindle oscillating in a vertical plane.

In the accompanying drawings, Figure 1 shows in sectional elevation the new bearing device and the disposition of the elevating apparatus in the interior of the trail. Fig. 2 is a side view; Fig. 3, a plan view; Fig. 4, a partial elevation of a gun provided with an elevating apparatus arranged according to the invention.

The new bearing is destined for the well-known screw elevating apparatus, which, as may be seen from Fig. 1, is here arranged in the interior of the carriage-trail. The trail-tube $a$ is cut away or divided to receive the elevating-gear and is reinforced by a tube-section $b$, surrounding the trail-tube. The tube $a$ is here shown as of a closed U-shaped section. It is, however, obvious that any other section—for instance, circular, square, or oval—might be used, if desired. The reinforcing-tube $b$ is provided with a side socket or tubular extension $c$ to receive the bearings for the driving-gear $d$ of the elevating-screw. The bevel-gear $d$ is integral with or fixed to a shaft $e$, terminating at its outer end in a squared portion $f$ for receiving a hand-crank $g$. The shaft $e$ is made hollow to form the bearing of one of the studs or trunnions $h$ of the spindle-casing $i$. The other trunnion $j$, of the casing $i$ is mounted in the wall of the trail-tube $a$ and the reinforcing-tube $b$. The upper opening provided in the trail-tube $a$ for the introduction of the elevating-screw spindles is closed by means of a cover $k$, which may be fixed by screws and is provided with an opening $l$ of appropriate width, through which the oscillating spindle passes. The opening at the under side of the trail-tube, through which also the spindle extends downwardly, is closed by means of a cap $m$.

In fitting up the elevating apparatus the casing $i$, together with the spindles, is first introduced through the upper opening and the trunnion $j$ is placed in its bearings in the tube-walls. Then the driving-gear $d$ is placed over the trunnion $h$, and the opening of the socket $c$ is closed by the bearing of the shaft $e$. After applying the handle the device is ready for use. As above mentioned, the cover $k$ closes the opening through which the elevating apparatus has been introduced. According to this invention the shaft of the driving-gear $d$ forms at the same time a bearing for one of the trunnions of the casing $i$. The elevating apparatus is placed within the trail-tube, and is therefore, without having to provide a special protective casing for the gear, protected against mechanical influences.

The whole construction of elevating apparatus is considerably simplified, owing to the driving-gear and shaft being formed as bearing for one of the pivot-studs of the casing, and there is only one opening in the wall of the trail necessary to receive both the shaft of the driving-gear and the pivot of the spindle-casing.

Having now particularly described and ascertained the nature of my said invention and in what manner the same is to be performed, I declare that what I claim is—

In a bearing for the elevating-screw apparatus of field-guns; the combination of the trail-tube; a reinforcement surrounding a perforated portion of said trail-tube; a tubular extension or socket on said reinforcement; a bushing secured in said socket; a hollow shaft passing through said bushing; a crank-handle on said hollow shaft; a bevel-gear on said hollow shaft; a trunnioned elevating-screw casing having a bevel-gear thereon meshing with the bevel-gear on said hollow shaft, one of the trunnions of said hollow screw-casing extending into the end of said hollow shaft, and the other trunnion of said casing having a bearing in said trail and reinforcement; and a screw-spindle in said screw-casing.

In testimony whereof I have hereunto set my hand in presence of two subscribing witnesses.

ERNST KARL ROTHE.

Witnesses:
MAXIMILIAN BLUHM,
ERNST HAMMLER.